United States Patent [19]

Grasso

[11] Patent Number: 4,518,850
[45] Date of Patent: May 21, 1985

[54] ELECTRIC COOKER HAVING TEMPERATURE WARNING MEANS

[75] Inventor: Alfie L. Grasso, Bewdley, England

[73] Assignee: Micropore International Limited, Droitwich, England

[21] Appl. No.: 347,537

[22] Filed: Feb. 10, 1982

[30] Foreign Application Priority Data

Feb. 18, 1981 [GB] United Kingdom ............... 8105068
Dec. 17, 1981 [GB] United Kingdom ............... 8138031

[51] Int. Cl.³ ............................................. H05B 1/02
[52] U.S. Cl. ..................................... 219/505; 219/506; 219/511; 219/465; 340/595
[58] Field of Search .............. 219/490, 494, 491, 508, 219/506, 505, 511, 464, 465; 340/584, 595

[56] References Cited

U.S. PATENT DOCUMENTS

| Re. 30,619 | 5/1981 | Decker | 219/506 |
| 3,600,118 | 8/1971 | Hirsbrunner | 219/511 |
| 3,612,826 | 10/1971 | Deaton | 219/464 |
| 3,670,960 | 6/1972 | Chambers | 219/511 |
| 3,906,424 | 9/1975 | Clancy et al. | 219/506 |
| 4,314,143 | 2/1982 | Bilstad et al. | 219/506 |
| 4,327,280 | 4/1982 | McWilliams | 219/464 |
| 4,357,525 | 11/1982 | Jenne | 219/511 |
| 4,394,646 | 7/1983 | Gossler | 219/511 |

Primary Examiner—M. H. Paschall
Attorney, Agent, or Firm—Browdy and Neimark

[57] ABSTRACT

An electric cooker having means for warning the user when one or more of the cooking surfaces is above a safe touching temperature comprises a glass ceramic cooking surface having one or more electrical heaters arranged on the underside of the cooking surface. A temperature monitoring device is thermally coupled with at least one of the one or more heaters and comprises an auxiliary heater, for example of PTC material, a thermally responsive device in the form of a thermistor, for example of PTC or NTC material, and a thermal buffer positioned between the auxiliary heater and the thermistor. A neon lamp or a filament lamp is provided for indicating when the thermistor is at or above a predetermined temperature.

9 Claims, 7 Drawing Figures

ELECTRIC COOKER HAVING TEMPERATURE WARNING MEANS

BACKGROUND OF THE INVENTION

The present invention relates to an electric cooker having means for warning the user when one or more of the cooking surfaces is above a safe touching temperature, and more particularly, but not exclusively, the present invention relates to glass ceramic top cookers having such warning means.

DESCRIPTION OF PRIOR ART

Problems can arise with electric cookers if there is no visible or other indication when the temperature of the cooking surface becomes too hot to touch without causing burns. Most cookers have a pilot light system to indicate when any of the heaters is electrically energised, but this does not give an adequate indication of a hazardous surface temperature, particularly in the case of glass ceramic top cookers. The pilot light is illuminated immediately the cooker is switched on, but the cooking surface will take some 15 to 50 seconds to reach a hazardous temperature, for example 50° to 60° C. More importantly, as soon as the heater is switched off, the pilot light is turned off, but the cooking surface remains hot for some time and, depending on the construction of the cooker and the time for which the heater has been operating, it can take from 20 to 80 minutes for the cooking surface to cool down sufficiently for it to be touched with safety.

Various devices have been used in commercial cookers to indicate a hazardous temperature of the actual cooking surface. It has been proposed to provide an electronic timer which energises a warning light as soon as the heater is switched on and which keeps the warning light illuminated for a predetermined time after the heater has been switched off. This timer, however, has the disadvantage that it indicates a hazardous temperature even if the heater has been energised for a very short time; for example, the heater may have been switched on in error without the cooking surface reaching a hazardous temperature. This results in the warning light losing credibility and in it being ignored by the user because he knows from experience that the cooking surface has not become hot. Nevertheless, if the cooking surface has been in use for a longer period, the warning light is necessary. These differences, however, are not always readily discernible to the user, and lead to confusion and to consequent danger to the user.

It has also been proposed to simulate temperature variations in the cooking surface and to operate a warning light switch in response to these simulated temperature changes. However, simulation devices are generally expensive and bulky, and often require more space than is available inside the cooker housing.

According to a further proposal, a warning light is actuated in direct dependence on the actual temperature of the heater or of the support of the heater. This design necessitates a slow response time because the heater as a whole has first to reach a predetermined temperature before the temperature responsive element operates and switches on the warning light. Auxiliary heaters have therefore been provided to reduce the response time of the temperature responsive element, but these still have not enabled a sufficiently accurate response to the temperature of the cooking surface to be achieved. A particular problem exists in the period following the initial response time and before the heater as a whole reaches a sufficiently high temperature to maintain the warning light illuminated, that is, in the period from about 20 seconds after switching on to about 5 minutes after switching on. During this period it is necessary to maintain the illumination of the warning light for up to about 20 minutes until the temperature of the glass ceramic top falls to a safe touching temperature. However, if the power output of the auxiliary heater is increased in order to reduce the initial response time, the duration of the period of illumination of the warning light is also extended, which results in the light being illuminated when the glass ceramic top is cool and consequently there is a risk of the light being ignored by the user.

OBJECT OF THE INVENTION

It is therefore an object of the present invention to provide a warning means which incorporates an auxiliary heater and which enables a warning light to be actuated promptly, but which cancels the warning light as soon as the temperature of the cooking surface falls to a safe level.

SUMMARY OF THE INVENTION

According to the present invention there is provided an electric cooker comprising:

a cooking surface;

one or more electrical heaters arranged on the underside of the cooking surface;

a temperature monitoring device thermally coupled with at least one of said one or more heaters and comprising a thermally responsive device in the form of a thermistor, an auxiliary electrical heater for supplying additional heat to the thermistor, and a thermal buffer located between the auxiliary heater and the thermistor; and means for indicating when the thermistor is at or above a predetermined temperature.

The thermistor may be made of a positive temperature coefficient material. The material preferably has a resistance of about 300 ohms at 25° C. and a switching temperature (Tr) of about 50° C. In such a case, the thermal buffer may be made from mild steel having a thickness of substantially 0.8 mm.

Alternatively, the thermistor may be made of a negative temperature coefficient material. This material preferably has a resistance of about 1200 ohms at 25° C. and a B-value of about 4000. The thermal buffer may be made from mild steel having a thickness of about 2.8 mm.

The or each heater may have a thermally conductive outer cover in the form of a metal dish, the temperature monitoring device being mechanically attached to the dish in heat transmissive relation thereto. The temperature monitoring device may be incorporated into a terminal block mounted on the metal dish for connecting the heater to a source of electrical power. Alternatively, the temperature monitoring device may comprise a hollow cylindrical housing which is closed at one end, the auxiliary heater, the thermal buffer and the thermistor being mounted in the housing. The housing may be made of a ceramic material and may be formed with two opposing axially-extending slits for the passage of connectors for the auxiliary heater and for the thermistor. A common connector is preferably located between the auxiliary heater and the thermistor, the common connector serving as the thermal buffer. The auxiliary heater, the buffer and the thermistor may be confined within the housing by means of a strip of spring steel which extends over the housing and engages with a pair of slots formed in a metal plate which is located across the open end of the housing. The temperature monitoring device is preferably mounted on the heater by means of the plate.

Alternatively, the housing may be made from aluminum or aluminum alloy, the auxiliary heater, the buffer and the thermistor being mounted within the housing by means of a curable composition such as silicone rubber.

According to a preferred embodiment of the invention, the auxiliary heater is substantially disc-shaped and has electrodes disposed solely on one face thereof, the thermistor is substantially disc-shaped and has electrodes disposed solely on one face thereof, and the thermal buffer is made of an electrically insulating material. The electrodes may be in the form of aluminum or aluminum alloy deposited onto the auxiliary heater and the thermistor. The thermal buffer may be made of a sheet of mica or of a film of polyimide material. Preferably, the components of the temperature monitoring device are secured together by encapsulating the components. The temperature monitoring device may be located in a reces formed in the base of the heater. The recess is preferably formed by producing a depression in a metal dish which forms an outer cover for the heater.

The auxiliary heater may be made of a positive temperature coefficient material. The positive temperature coefficient material may have a resistance of from 500 to 2500 ohms at 25° C. and a switching temperature (Tr) of at least about 185° C.; preferably the material has a resistance of 1200 ohms at 25° C. and a switching temperature (Tr) of about 185° C.

Preferably, the auxiliary heater is electrically connected in parallel with a heating element of the heater with which it is associated. The indicating means may comprise a discharge lamp or a filament lamp.

Preferably, the cooking surface is made of glass ceramic and the or each electrical heater is a radiant heater unit.

For a better understanding of the present invention and to show more clearly how it may be carried into effect reference will now be made, by way of example, to the accompanying drawings in which:

BRIEF DESCRIPTION OF THE DRAWINGS

FIG. 2 is an exploded view, in more detail and on a larger scale, of a temperature monitoring device;

DESCRIPTION OF PREFERRED EMBODIMENTS

Figure 1:
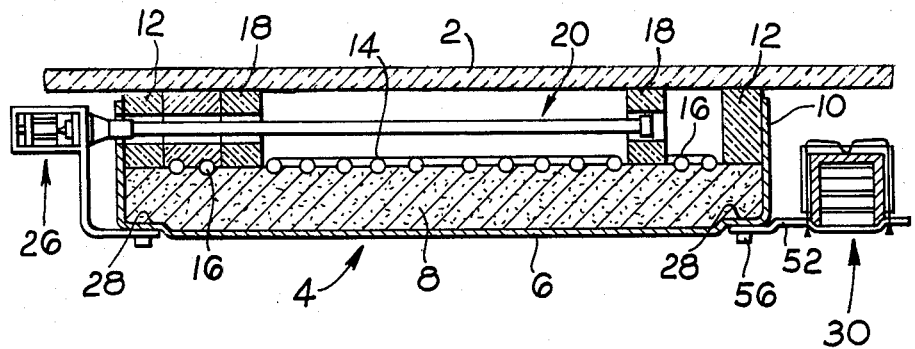
FIG. 1 is a diagrammatic cross-sectional view through a part of one embodiment of an electric cooker according to the present invention.

The electric cooker shown in FIGS. 1 and 2 comprises a glass ceramic top 2 having a radiant heater 4 arranged immediately beneath the top. The heater 4 comprises a metal dish 6 containing a base layer 8 of electrical and thermal insulation material. Against the side 10 of the dish there is located a peripheral wall 12 of thermal insulation. The base layer 8 preferably comprises a microporous insulating material such as a mixture of silica aerogel, an opacifier and, if necessary, reinforcing fibres of alumina or aluminium silicate, and the peripheral wall 12 preferably comprises ceramic fibres. Set in grooves formed in the base layer 8 are two electric heating elements 14 and 16 which are separated from each other by a dividing wall 18, for example of ceramic fibres. Each heating element 14, 16 is in the form of a helically wound coil of bare wire. Extending over the inner element 14 is a thermal cut-out device 20 which is operable to switch off both elements in the event of overheating.

Each element 14 and 16 is energisable separately by way of terminal connectors (not shown) to enable a relatively small pan or other utensil to be heated solely by element 14 and to enable a larger casserole or other utensil to be heated by both elements 14 and 16. Typically, the element 14 is rated at 1400 watts and the element 16 is rated at 800 watts. Each coil is secured in the base layer 8 by means of staples (not shown) and is preferably made from an iron-chromium-aluminium resistance heating wire.

The thermal cut-out device is of the differential expansion type and comprises a quartz tube containing a metal rod. Differential expansion between the tube and the rod as a consequence of overheating operates a mechanical switch 26 to disconnect both elements 14 and 16 from the power source. Although a thermal cut-out device could be located adjacent to each element 14, 16, it has been found that one cut-out device over the element 14 is quite satisfactory.

The radiant heater 4 has a step junction 28 between the underneath and the side of the metal dish 6 to facilitate mounting of the heater in the cooker, for supporting the thermal cut-out device, and for mounting a temperature monitoring device as will be described in detail hereinafter. The step junction may be provided with screw holes for use in securing the heater.

The peripheral wall 12 and the dividing wall 18 are located against the underside of the glass ceramic top 2. Thus, the heater defines on the surface of the glass ceramic two concentric heating zones heated by the element 14 and the element 16.

The influence of the element 14 is thus confined to a central region of the heater by the base layer and the dividing wall and direct thermal communication with a temperature monitoring device is effectively precluded unless the device is mounted at the base of the heater where there is generally insufficient space available.

The temperature of the glass ceramic top 2 is monitored by means of a temperature monitoring device 30 which is shown in detail in FIG. 2. The temperature monitoring device 30 comprises a housing 32, for example of ceramic material, of generally hollow cylindrical construction, but closed at one end. Openings 34 are formed in the housing 32 for the passage of connections 36, 38 and 40 for an auxiliary heater 42 and for a temperature responsive device 44. The connections, 36, 38, 40 comprise sheet metal plates having radial projections which extend through the openings 34 for securing connecting leads (not shown).

In the embodiment shown in FIG. 2, a heat store 46, for example in the form of a mild steel disc, having a thickness of about 2 mm, is positioned between the auxiliary heater 42 and the connection 38. Further, the temperature responsive device 44, is surrounded by a ring 48, of electrically insulating, for example ceramic, material.

The components of the temperature monitoring device are confined within the housing 32 by a cap 50, for example of ceramic material, which cap engages with a depression formed in plate 52. The housing 32 is secured to the plate 52 by a strip 54 of spring steel which passes around the housing and engages with a pair of slots formed in the plate 52. The engagement of the strip 54 in the plate 52 urges the components of the temperature monitoring device towards the closed end of the housing 32 to hold them in position. The strip 54 lies in a groove formed in the outer surface of the housing 32 and the ends of the strip are bent over to maintain the strip in engagement with the plate 52. The plate 52 extends from the housing 32 to provide the means by which the temperature monitoring device is mounted on the heater (see FIG. 1) and is provided with a ridge to ensure accurate positioning of the device relative to the heater. The device may be mounted on the heater by means of a screw 56 which engages in one of the holes formed in the step junction 28.

Figure 3:
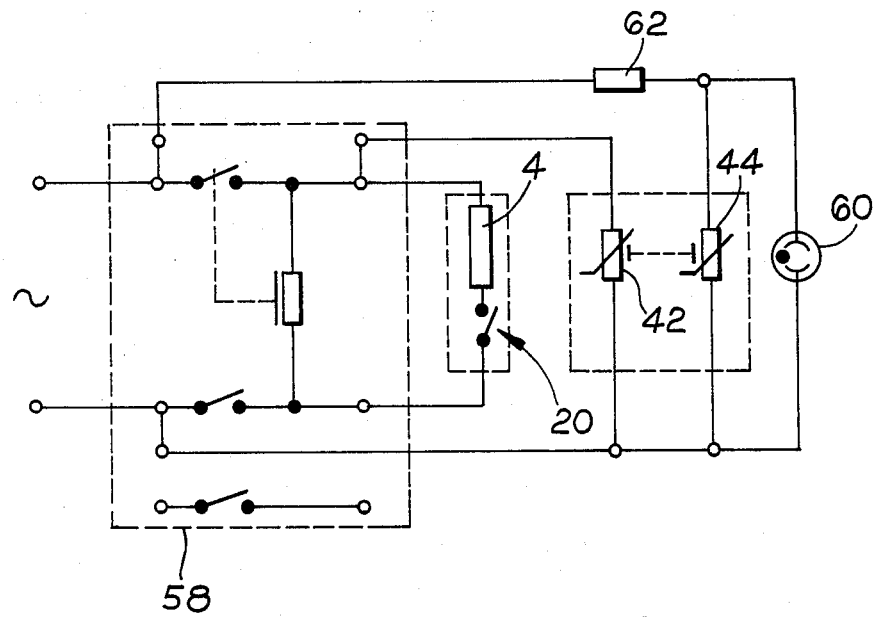
FIG. 3 is a circuit diagram incorporating the temperature monitoring device.

In the circuit diagram shown in FIG. 3, an energy regulator 58 is enclosed by a dotted line. The heater 4 is connected in parallel with the energy regulator and the thermal cut-out device 20 is connected in series with the heater. The auxiliary heater 42 of the temperature monitoring device is also connected in parallel with the energy regulator. Thus, when the heater is energised, a voltage is applied across the auxiliary heater. In the illustrated embodiment, the auxiliary heater comprises a material which has an electrical resistance which rises with temperature or which rises substantially at a given temperature. Such materials are referred to herein as positive temperature coefficient (PTC) materials and include n-type semiconductor materials such as doped barium titanate, which is barium titanate (which is normally insulative) doped with strontium. This material has a resistivity which falls as its temperature rises to about 200° C., but which increases rapidly as the temperature reaches this level. This characteristic of the material enables the auxiliary heater to act also as a thermostat, maintaining the temperature of the temperature responsive device 44 at about 200° C. In this way, overheating of the temperature monitoring device can be avoided in a simple manner, as can energy wastage due to the continuous passage of electricity through the auxiliary heater circuit. A particularly suitable PTC element has a resistance of 1200 ohms at 25° C. and a switching temperature (Tr) of about 185° C.

The heat from the auxiliary heater is transferred to the temperature responsive device 44 by way of the common connection 36. In the embodiment shown in FIGS. 2 and 3 the temperature responsive device is a thermistor made of PTC material which has a lower switching temperature than the material forming the auxiliary heater. A suitable PTC element has a resistance of about 300 ohms at 25° C. and a switching temperature (Tr) of about 50° C. The temperature responsive device is connected, in parallel with a lamp 60, to a voltage supply which is applied permanently. The common connection 36 determines the time lapse between energisation of the auxiliary heater and energisation of the lamp 60. The time lapse between de-energisation of the auxiliary heater and de-energisation of the lamp is determined by the heat store 46 in the situation in which the body of the heater 4 has not become sufficiently hot to control the operation of the lamp 60. It has been found that mild steel having a thickness of about 0.8 mm ensures that the lamp 60 is energised in about 10 to 25 seconds which corresponds to the time required by the glass ceramic top 2 to reach a hazardous temperature of about 50° to 60° C. The common connection 36 therefore functions as a thermal buffer between the auxiliary heater and the temperature responsive device. It has also been found that a heat store made of mild steel and having a thickness of about 2 mm ensures, in conjunction with the other components of the temperature monitoring device, that the lamp 60 remains energised until the glass ceramic top falls to a safe touching temperature.

In use, when the heating element 14 is energised, or when both heating elements 14 and 16 are energised, the auxiliary heater 42 is also energised and the temperature of the temperature responsive device rises under the control of the common connector 36. Initially, electric current flows primarily through the device 44 because its resistance is low, but as the temperature of the device rises its resistance increases. The lamp 60 is typically a neon lamp or a filament lamp. With a neon lamp a specific temperature of the device 44 will determine when the lamp illuminates, i.e. that temperature which causes the voltage across the lamp to exceed the striking voltage of the lamp, for example 180 V. The lamp will remain energised for as long as the voltage remains at or in excess of the maintaining voltage, e.g. 150 V. However, with a filament lamp the degree of illumination is more progressive with the lamp becoming steadily brighter as the voltage increases.

This latter arrangement has the additional advantage of enabling the intensity of illumination to correspond with the temperature of the glass ceramic top. If necessary, in either or both of the arrangements, a resistor 62 may be included to protect the lamp 60 and/or the device 44.

For so long as the heating element 14, and possibly the heating element 16, is energised and until thermal equilibrium is reached, the body of the radiant heater increases in temperature, while the auxiliary heater 42 maintains the lamp 60 energised. However, when the heating element 15, and possibly also the element 16, is de-energised at the completion of cooking, the auxiliary heater 42 is also de-energised. The temperature responsive device will then cool, but the rate of cooling will be slowed by the heat retained in the temperature monitoring device particularly by the heat store 46, and by heat transmitted from the radiant heater 4 by radiation and convection from the metal dish 6 and by conduction along the plate 52. Heat transfer to the device 44 from the heat store 46 is once again controlled by the common connector 36. In this way, the temperature monitoring device 30 can be constructed such that the lamp 60 is not de-energised until the temperature of the glass ceramic top 2 falls to a safe level.

In general, because of the relatively high heat output of the heating element 14 in the embodiment described, it has been found that a single temperature monitoring device can adequately monitor the temperature of the glass ceramic top both when only the heating element 14 is energised and when the heating elements 14, 16 are energised simultaneously. It should be noted, though, that the construction of the radiant heater 4 is not restricted to two concentric heating elements and that many alternative constructions may be used.

Although it is not shown in the drawings, the components of the temperature monitoring device can be contained in a housing made of aluminium or aluminium alloy, the components being mounted in the housing by means, for example, of a silicone rubber composition. In addition to providing mechanical support for the components, the silicone rubber also provides electrical and thermal insulation and can act as a heat store.

The temperature monitoring device need not be fixed directly to the side of a radiant heater, but provided that it is thermally linked to one or more of the heaters, can be mounted at any convenient position within the cooker.

Figure 4:
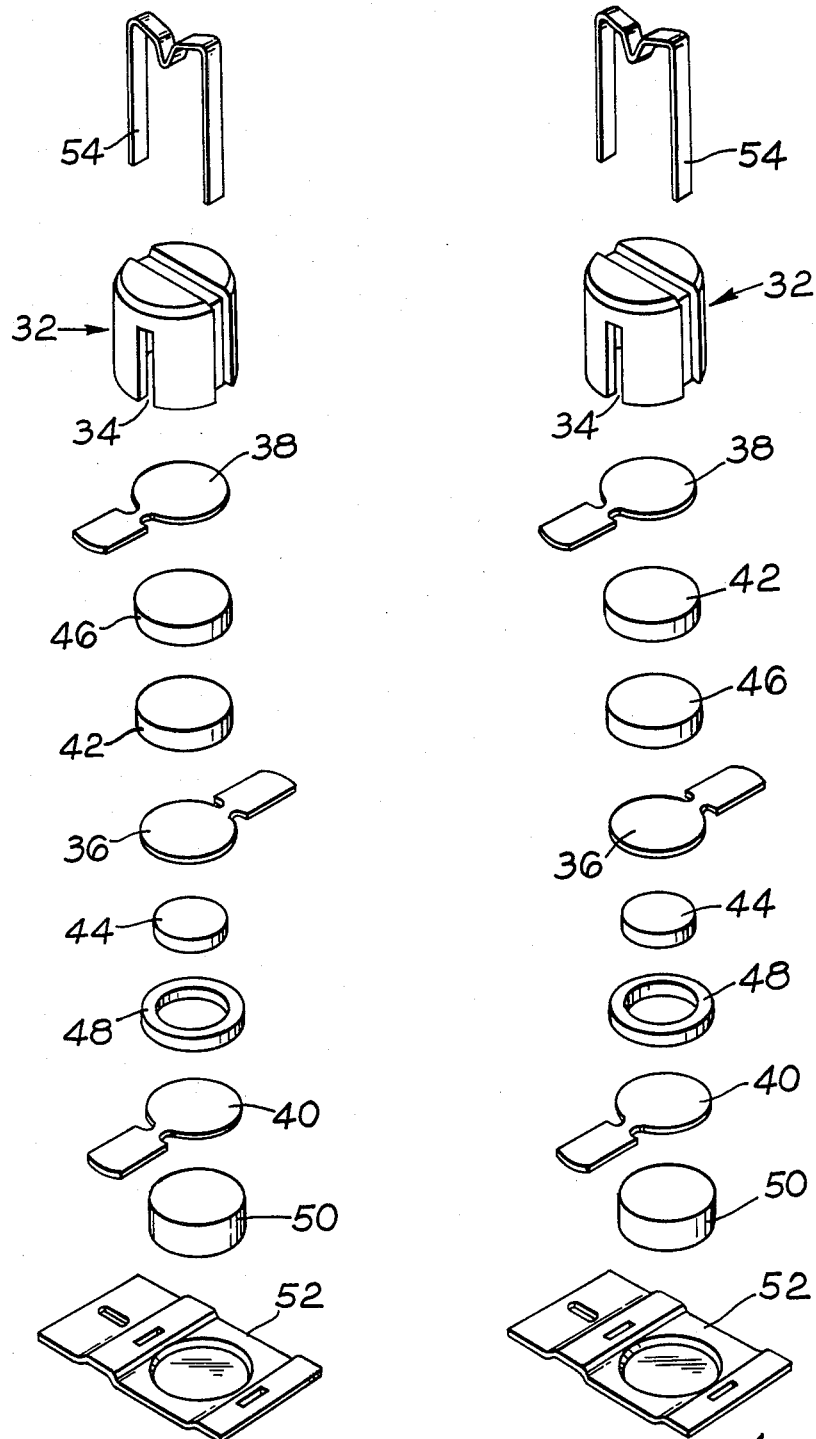
FIG. 4 is an exploded view of an alternative form of temperature monitoring device.

In the embodiment shown in FIG. 4, the temperature responsive device 44 comprises a thermistor made of negative temperature coefficient (NTC) material, such as doped iron, nickel or cobalt oxide. Such a temperature responsive device may be connected in series with a lamp 60, for example a filament lamp, to obtain a progressive illumination as described above. Once again, a protective resistor may be used if necessary. It will be noted in FIG. 4 that the positions of the auxiliary heater 42 and the heat store 46 are reversed so that the heat store also functions as a supplementary buffer in order to control the heat flow to the temperature responsive device 44. A suitable NTC element has a resistance at 25° C. of 1200 ohms. and a B-value of about 4000.

In general, in radiant heaters for glass ceramic top cookers, the electrical connections to the heating element or heating elements are normally made by way of a terminal block which is mounted on the metal dish. Thus, the components of the temperature monitoring device may be mounted in such a terminal block to form an integrated assembly. This further reduces the space requirements and the number of electrical connections needed, and enables all the electrical connections to be made at the same point. By adopting this feature, assembly of the radiant heater as a whole, and its incorporation in the cooker, are simplified with a consequent reduction in labour costs.

Figure 5:
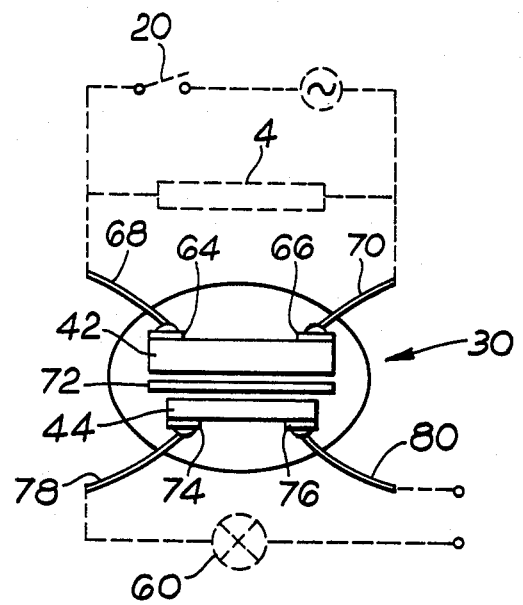
FIG. 5 is a diagrammatic cross-sectional view through another form of temperature monitoring device.
Figure 6:
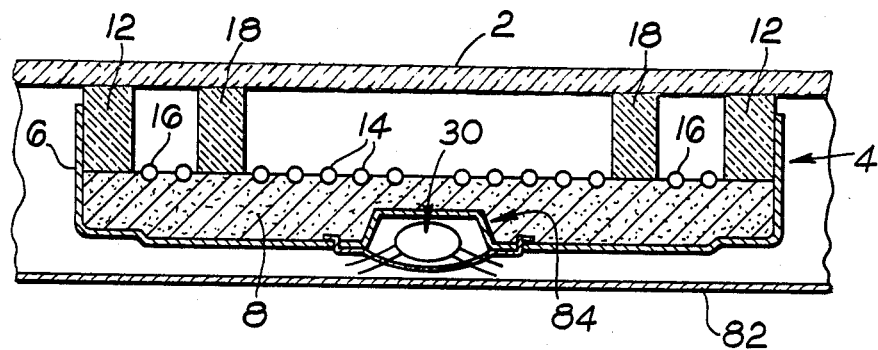
FIG. 6 shows the temperature monitoring device of FIG. 5 mounted in the base of a radiant heater which is arranged beneath the glass ceramic top of the cooker.

In the embodiment shown in FIGS. 5 and 6, two electrodes 64, 66 are formed on the same face of the auxiliary heater 42 which is formed of PTC material. Previously, such PTC elements have been provided with electrodes on the opposite faces thereof. Leads 68, 70 are attached to the electrodes by any suitable high-temperature-resitant means. Suitable methods of attaching the leads include ultrasonic bonding. Located adjacent to the opposite face of the auxiliary heater 42 is a layer 72 of insulation material, for example of mica or polyimide film. The insulation material separates the auxiliary heater 42 from the temperature responsive device and also acts as a thermal buffer between the two components so as to control the heat flow from the auxiliary heater to the temperature responsive device as explained hereinabove. The temperature responsive device is a thermistor which may be made of a PTC material similar to the material used in the embodiment of FIGS. 2 and 3 or an NTC material similar to the material used in FIG. 4. It will be appreciated that the electrical circuit shown in FIG. 5 is intended for an NTC material, but an electrical circuit suitable for a PTC material can readily be devised by a person skilled in the art, particularly from FIG. 3. As with the auxiliary heater 42, the temperature responsive device 44 is provided with two electrodes 74, 76 on the same face of the device. Leads 78, 80 are attached to the electrodes 74, 76, for example by the same means as with the electrodes 64, 66. All the electrodes 64, 66, 74, 76 may be, for example, of aluminum or aluminum alloy deposited onto the surface of the auxiliary heater and the temperature responsive device.

The components of the temperature monitoring device are secured together, for example by encapsulating the components in a suitable high-temperature-resistant material 82 such as a silicone-based material, a polyimide-based material, or a ceramic-based cement.

With the construction shown in FIG. 5, it is possible to reduce the overall thickness of the temperature monitoring device by several millimeters and to permit the device to be fitted into the base of a radiant heater, which would not be possible if the conventional arrangement of electrodes was adopted.

FIG. 6 shows the temperature monitoring device 30 mounted in the base of the radiant heater 4. FIG. 6 also shows the glass ceramic top 2 and a base 82, for example of sheet metal, of the electric cooker. The space between the base of the radiant heater 4 and the base 82 is typically about 5 mm. As can be seen in FIG. 6, a recess 84 is formed in the base of the radiant heater 4. The recess 84 may be formed simply by removing a part of the metal dish 6 and a part of the base layer 8. However, it is preferable to form the recess by forming a depression in the metal dish and providing the base layer in a suitable configuration around the depression. By forming a depression in the metal dish, the temperature in the recess can be reduced from about 300° C. to about 250° to 280° C. which enhances the stability of the temperature monitoring device. Preferably, the recess has a depth of about 5 mm. The temperature monitoring device may be mounted in the recess by any suitable means. For example, a spring clip may be used which engages in holes formed in the metal dish.

By adopting the construction shown in FIG. 5, it is possible to manufacture a temperature monitoring device having a depth of some 7 to 9 mm, which permits the device to be mounted on the underside of the radiant heater provided that there is a recess about 5 mm deep formed in the base of the heater unit. It should be noted, though, that the depth of the recess may be limited by the temperature which can be tolerated in the recess. The heating elements generally run at about 900° C. and if the recess is too deep the temperature will rise to an unacceptably high level. For this reason, the depth of the recess is in practice limited to about 5 mm. Thus, unless a construction as shown in FIGS. 5 and 6 is adopted, it is not possible to mount such a temperature monitoring device on the underside of the heater.

Figure 7:
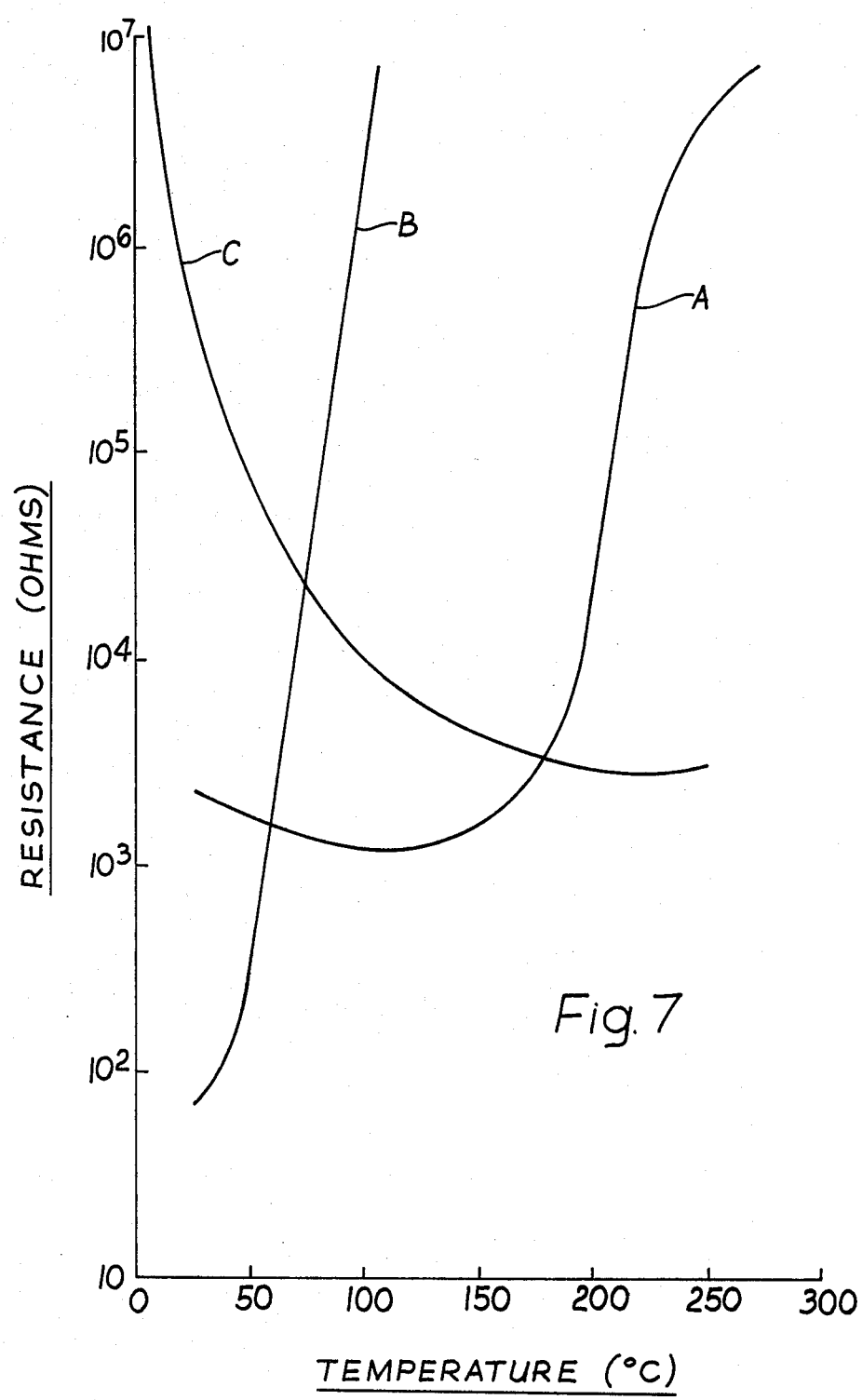
FIG. 7 is a graph showing three curves which represent the variation of electrical resistance at zero voltage of devices incorporating PTC or NTC materials that may be used in the present invention.

FIG. 7 shows in curve A the characteristics of a suitable material for a PTC auxiliary heater. Curve B shows the characteristics of a suitable material for a PTC temperature responsive device, and curve C shows the characteristics of a suitable material for an NTC temperature responsive device.

While the invention has been described in detail above, it is to be understood that this detailed description is by way of example only, and the protection granted is to be limited only within the spirit of the invention and the scope of the following claims.

I claim:

1. An electric cooker comprising:
a cooking surface;
one or more electrical heaters arranged on the underside of the cooking surface;
a temperature monitoring device in the form of a hollow cylindrical housing which is closed at one end and having mounted therein;
a thermally responsive device in the form of a thermistor;
an auxiliary electrical heater for supplying heat to the thermistor when at least one of said one or more electrical heaters is energized; and
a thermal buffer located between the auxiliary heater and the thermistor such that the thermistor is heated to at least a predetermined temperature after at least one of said one or more electrical heaters is energized consistent with said cooking surface rising above a safe touching temperature;
means for thermally coupling said temperature monitoring device with at least one of said one or more electrical heaters such that when said one or more electrical heaters are subsequently de-energized said thermistor cools below said predetermined temperature consistent with said cooking surface falling to said safe touching temperature; and
means for indicating when said thermistor is at or above said predetermined temperature.

2. An electric cooker as claimed in claim 1, wherein the housing is made of a ceramic material.

3. An electric cooker as claimed in claim 1, wherein the housing is formed with two opposing axially-extending slits for the passage of connectors for the auxiliary heater and for the thermistor.

4. An electric cooker as claimed in claim 1, wherein a common connector is located between the auxiliary heater and the thermistor, the common connector serving as the thermal buffer.

5. An electric cooker as claimed in claim 2, wherein the auxiliary heater, the buffer and the thermistor are confined within the housing by means of a strip of spring steel which extends over the housing and engages with a pair of slots formed in a metal plate which is located across the open end of the housing.

6. An electric cooker as claimed in claim 5, wherein the temperature monitoring device is mounted on the heater by means of the plate.

7. An electric cooker as claimed in claim 1, wherein the housing is made from aluminum or aluminium alloy, the auxiliary heater, the buffer and the thermistor being mounted within the housing by means of a curable composition.

8. An electric cooker as claimed in claim 7, wherein the curable composition is a silicone rubber.

9. An electric cooker comprising:
a cooking surface;
one or more electrical heaters arranged on the underside of said cooking surface;
a temperature monitoring device;
said temperature monitoring device comprising means to simulate the temperature of said cooking surface in the range from a predetermined safe human touching temperature of said surface up to cooking temperatures higher than said safe touching temperature;
said temperature monitoring device comprising a separate pre-assembled module;
means to locate said module so that it is thermally coupled with said cooking surface and said one or more electrical heaters;
said temperature monitoring device comprising a thermally responsive device in the form of a thermistor, an auxiliary electrical heater for supplying heat to the thermistor when at least one of said one or more electrical heaters is energized, and a thermal buffer located between the auxiliary heater and the thermistor such that the thermistor is heated to at least a predetermined temperature after at least one of said one or more electrical heaters is energized consistent with said cooking surface rising above said safe touching temperature;
said thermistor being made of a temperature responsive material of a switching temperature coefficient type;
the switching temperature of said thermistor being selected to correspond to said cooking surface safe touching temperature;
said temperature monitoring device acting to simulate the temperature of said cooking surface in said range from said cooking temperatures down to said safe touching temperature by flowing heat within said module from said thermal buffer to said thermistor;
said heat flow within said module being so controlled by the size, shape and arrangement of the parts thereof that said thermistor cools at a rate of speed and to decreasing temperatures so as to correspond to the natural cooling of said cooking surface;
circuit means interconnecting said temperature monitoring device internal heater, said one or more electrical heaters, said module, a power supply, and said thermistor temperature indicating means, so that after power to said one or more electrical heaters is cut off, said indicating means remains activated until said thermistor cools to its switching temperature corresponding to said cooking surface having cooled to said safe touching temperature; and
said circuit means further comprising means to cause further cooling of said thermistor below said switching temperature to cause said thermistor to switch and to thereby de-activate said indicating means.

* * * * *